June 6, 1950     R. D. VAN TASSELL     2,510,354
VULCANIZER AND METHOD
Filed July 2, 1945     3 Sheets-Sheet 1
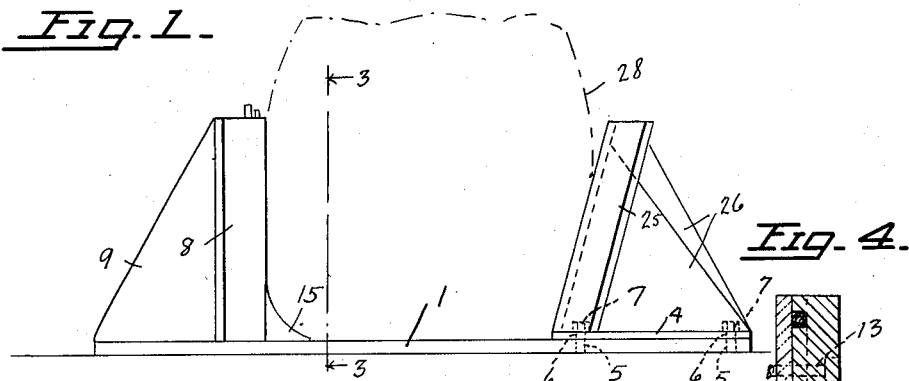
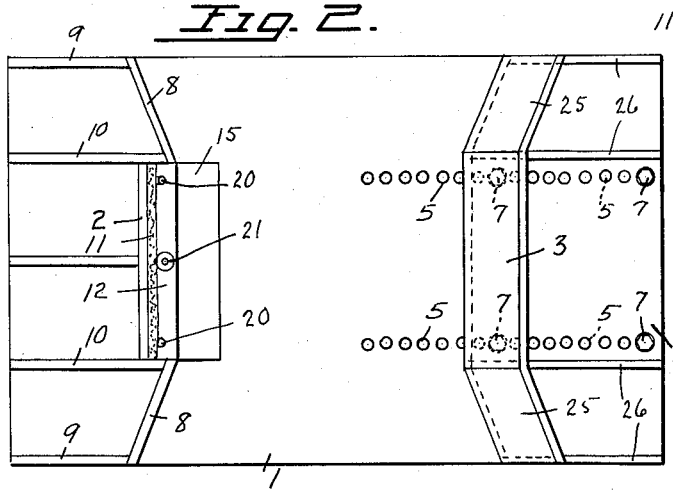
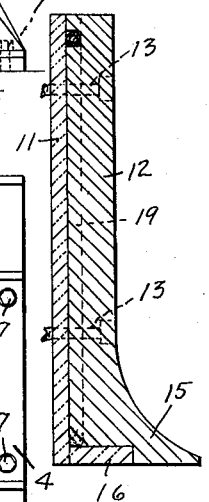
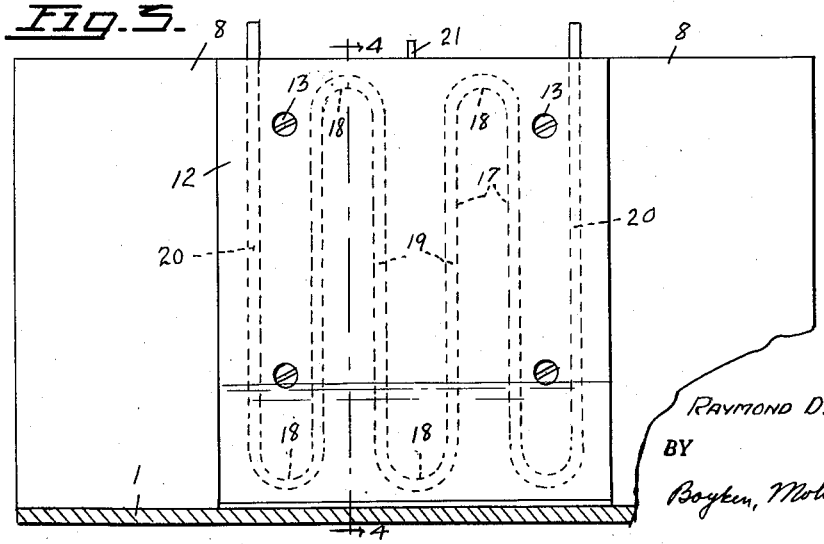
INVENTOR.
RAYMOND D. VAN TASSELL.
BY
Boyken, Mohler & Beckley
ATTORNEYS.

June 6, 1950  R. D. VAN TASSELL  2,510,354
VULCANIZER AND METHOD
Filed July 2, 1945  3 Sheets-Sheet 2
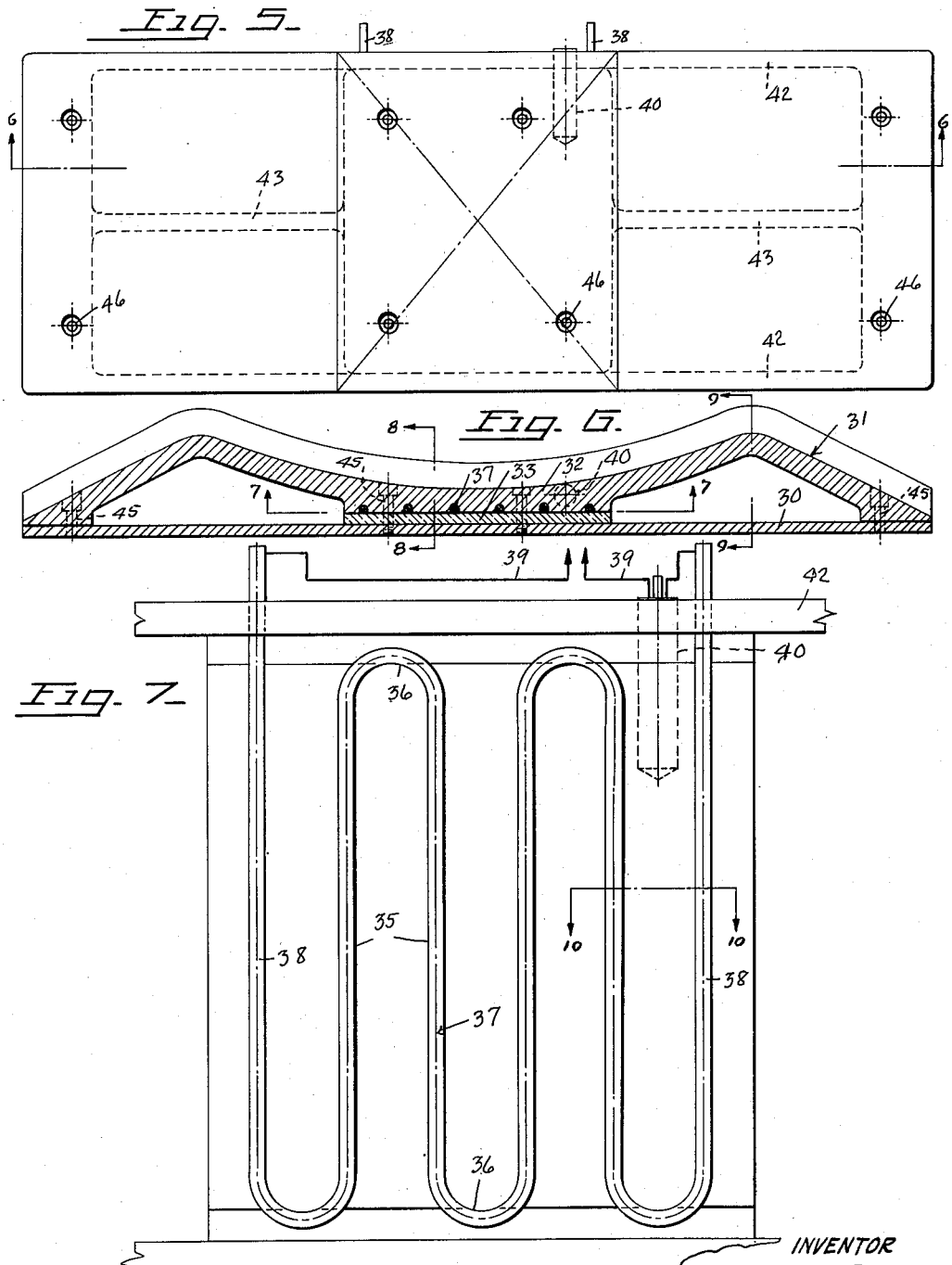

June 6, 1950 R. D. VAN TASSELL 2,510,354
VULCANIZER AND METHOD
Filed July 2, 1945 3 Sheets-Sheet 3
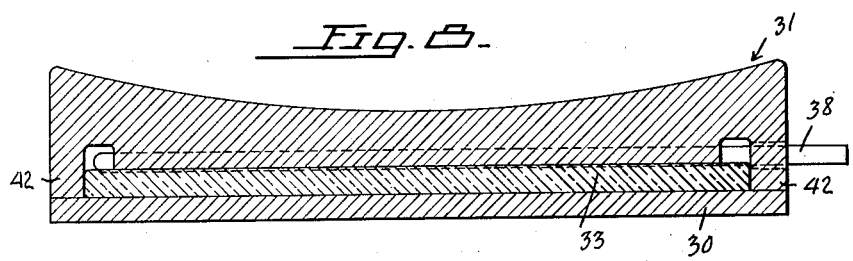
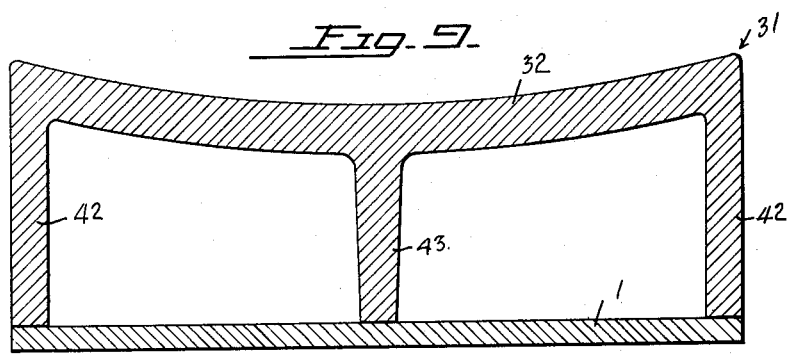
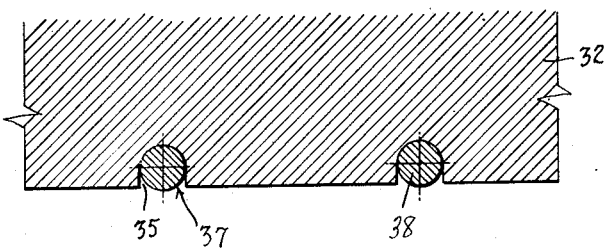
INVENTOR
RAYMOND D. VAN TASSELL
BY
Boyken, Mohler & Beckley
ATTORNEYS.

Patented June 6, 1950

2,510,354

UNITED STATES PATENT OFFICE 2,510,354

VULCANIZER AND METHOD

Raymond D. Van Tassell, Indianapolis, Ind.

Application July 2, 1945, Serial No. 602,711

6 Claims. (Cl. 18—18)

1

This invention relates to tire vulcanizers.

One of the objects of the invention is the provision of an improved vulcanizer for use in making repairs of external injuries on pneumatic tires while such tires are inflated and on the vehicles in vehicle supporting position.

Another object is an improved method of making repairs of external injuries on pneumatic tires where vulcanizing is involved.

Heretofore it has been the common practice in the case of injuries on the external surface of a pneumatic tire to first remove the tire from the rim and then remove the tube, after which a special spot vulcanizer is used to vulcanize vulcanizable material onto the tire at the point of injury. A sand bag or the like, is ordinarily required and at best the procedure is so slow and costly that in many instances the tire is permitted to remain in use until ruined or until a section is required rather than to remove the tire and effect the surface repair.

This invention eliminates the necessity for removing the injured tire from the vehicle and also eliminates the use of clamp type vulcanizers which at best, are relatively awkward and slow to use, and also which clamp type vulcanizers in many instances are unable to effect the desired repair, particularly where the injury is to the tread or to one or the other of the side walls, according to the type of vulcanizer employed.

In the drawings:

Fig. 1 is a side elevational view of a vulcanizer indicating in dot-dash line the cross-sectional contour of a tire.

Fig. 2 is a plan view of the vulcanizer of Fig. 1.

Fig. 3 is an enlarged sectional view taken along line 3—3 of Fig. 1.

Fig. 4 is a sectional view taken along line 4—4 of Fig. 3.

Fig. 5 is a plan view of a tread repair type of vulcanizer.

Fig. 6 is a sectional view taken along line 6—6 of Fig. 5.

Fig. 7 is an enlarged plan view of a portion of the underside of the tread receiving member substantially as seen along line 7—7 of Fig. 6.

Fig. 8 is an enlarged sectional view taken along line 8—8 of Fig. 6.

Fig. 9 is an enlarged sectional view taken along line 9—9 of Fig. 6.

Fig. 10 is an enlarged sectional view taken along line 10—10 of Fig. 7.

In detail, referring to the device of Figs. 1 to 4, the numeral 1 constitutes a base plate adapted to lie horizontal on the ground or floor, and onto

2 which any one of the wheel mounted tires on a vehicle is adapted to roll. The plate 1 is relatively wide, which width is preferably slightly greater than the length of the tread portion of an inflated tire that contacts the road when said tire supports its part of the vehicle in normal use.

One end of plate 1 carries a vertical plate 2 (Fig. 2) that is preferably centrally positioned with respect to the opposite longitudinally extending edges of the base plate, and which plate 2 may be termed a "side plate" to distinguish it from base plate 1. Opposite the side plate 2 and in generally opposed relation to the latter is a side plate 3 that is slightly tilted away from the side plate 2 so as to be spaced a greater distance at its upper end from side plate 1 than it is at its lower end.

The side plate 2 is preferably formed integrally with base plate 1, whereas side plate 3 is preferably formed with a horizontal flange 4 along its lower edge that is movably supported on base plate 1 (Figs. 1, 2).

The base plate 1 is formed with a pair of spaced rows of parallel openings 5 that extend longitudinally of base plate 1, and the flange 4 carries several pairs of holes 6 that are in registration with corresponding pairs of openings 5 in the base plate 1. Bolts 7 in said registering openings may secure the flange to the base plate at various distances of said flange from the side plate 2, thus making it possible to vary the spacing between side plates 2, 3 as desired.

Formed integrally with the base plate 1 and adjacent the opposite vertical edges of side plate 2 and extending from adjacent said edges in a direction away from the end of the plate 1 that supports plate 3 is a pair of wing plates 8. Vertically disposed parallel ribs 9 (Fig. 1) extend along the longitudinal edges of the base plate and are secured to the wing plates 8 along their opposite outer edges. Said ribs provide braces for said plates along said edges and other ribs 10 along the adjacent edges of said wing plates provide similar braces for said plates along said adjacent edges.

As will be noted in Fig. 2 the opposite vertical edges of plate 2 are spaced from the adjacent edges of wing plates 8 and between ribs 9 thus providing a rectangular recess opening toward the side plate 3, the bottom of which recess is the plate 2. In this recess and against plate 2 is a sheet of heat insulation material 11 (Fig. 2) and a vertical vulcanizing side plate 12 is positioned in the recess against said material 11, said plate 12 being preferably removably secured to plate 2 by bolts 13 having their heads countersunk in plate 11 and substantially flush with the side of said plate that faces side plate 3.

The bottom portion of plate 12 is curved toward plate 3 as at 15 to substantially conform to the cross-sectional curvature of an inflated tire at the shoulder. The lower edge of said plate 12 is recessed from the rear side of the plate that is against insulation material 11 and insulation material 16 is in said recess (Fig. 4) to prevent undesirable transfer of heat from the lower portion of plate 12 to the base plate 1.

The side of plate 12 adjacent said insulation material 11 is formed with a plurality of parallel vertically extending grooves 17 connected by arcuate grooves 18 at their ends (Fig. 3) for receiving therein a rod type electrical heating element 19 that is in the form of parallel lengths connected at their ends by return bends. The end lengths 20 of said element are in end grooves that open outwardly of the upper edge of plate 12 for projection of said lengths 20 and for connection thereof in the usual manner with a source of electrical energy. A thermostat 21 also carried in heat transfer relation with plate 12 may be connected in series with said lengths 20 for controlling the current to said heating element.

The side plate 3 has wing plates 25 extending from its side edges in direction away from the wing plates 8 that are at the other end of the base plate. These wing plates 25 also incline in an upward direction similar to the side plate 3. Flange 4 extends from their lower edges the same as from the lower edge of plate 3, and a plurality of parallel vertically disposed ribs 26 integral with the flange 4 and with the side plate and wing plates form braces for said plates.

The use of the term "integral" in describing the structure of the vulcanizer of Figs. 1 to 3 merely means inseparably formed as where parts are welded or are cast together.

In operation the tire on a vehicle that has suffered an external or surface injury is prepared in the usual manner for application of vulcanizable material thereon and such material is positioned on the prepared portion.

The device of Fig. 1 is then positioned on the floor or ground in the path of said tire 28 (Fig. 1) and so that movement of the vehicle toward said device will cause the injured tire to roll between the side plate 3 and vulcanizing plate 12 and so that the vulcanizable material will engage said plate 12.

Between the said channel member 31 and base plate 30 and below the central concave portion 32 of said member on which the tire is to be supported is a sheet of heat insulation material 33. The lower side of portion 32 is flat and is formed with grooves 35, 36 that correspond with grooves 17, 18 of Fig. 3. A heating element 37 having end lengths 38 corresponding to end lengths 20 of Fig. 3 lies in said grooves above said insulation material 33 (Fig. 7). The ends of said lengths 38 project for connection in an electrical circuit 39 and a thermostat 40 fitted in a recess in said portion 32 is connected in series with said heating element in said circuit for controlling the heat.

End ribs 42 extending longitudinally of plate 30 and along its longitudinal edges are integral with the member 31 for supporting the latter on plate 30 and for enclosing the insulation material as well as for coacting with ribs 43 for reinforcing the member 31.

The member 31 may be removably secured to base plate 30 by stud bolts 45 (Fig. 6) in openings extending through holes 46 (Fig. 5) in said member 31, the base being formed with threaded openings for said bolts.

It is pertinent to note that the upper contour of the portion 32 of the member 30 is curved to also conform with the circumferential contour of an inflated tire.

In operation the device of Fig. 6 is positioned on the floor or ground the same as for the device of Fig. 1 and after the vulcanizable material is placed on the prepared tread portion that has been injured the vehicle is moved so that the said portion will roll onto the portion 32 of member 30. The weight of the vehicle and the air in the tire coact to hold the tire in close contact with said portion 32 and upon the desired heating of said portion the repair is effected.

The spacing between plate 12 and side plate 3 is such that the wing plates 8, 25 at the side from which the tire enters will cause a wedging action on the tire flattening the portion to be repaired against the vulcanizing plate. The air inside the tire and the weight of the vehicle will hold the portion to be vulcanized tightly against the vulcanizing plate 12 causing the desired pressure on the vulcanizable material. The heating of plate 12 will then effect the desired vulcanizing of the material after which the vehicle may be moved to roll the tire from the vulcanizer.

The above method thus effects a repair of the tire without removing it from the vehicle and with the maximum of speed. Where a fleet of vehicles are used, or in any instance where maintenance facilities for automobiles are operating at night, it is apparent that the tires may be inspected and repaired each night without loss of the services of the vehicle as would many times be the case where the wheels and tires must be removed to effect a repair.

The provision of the similar sets of wing plates 8, 25 enables the vulcanizer to be used on any one of the tires of the vehicle and the latter may be moved forwardly or rearwardly in each instance onto the vulcanizer.

While heating elements may be used in the base plate 1 for tread repairs, I prefer in most instances to use the same method of effecting a repair of an inflated tire but with the device of Figs. 5 to 10.

This device comprises a base plate 30 adapted to be positioned horizontally on the ground, and on said base plate, which is elongated, is a shallow channel member 31 the channel portion of which extends transversely of the length of the base plate and the cross-sectional contour of which conforms substantially to the cross-sectional contour of the tire to be repaired.

For different sized tires different members 30 may be used and the same may be said for the plate 12 of Fig. 2.

In certain instances where the injury to the casing is such that it is desirable to apply heat to both the inner and outer sides of the casing operators in using the devices herein described have exhausted the air in the tire to be repaired and injected steam into the inner tube instead. This method has been found to be very satisfactory and does not necessitate removal of the tire casing from the wheel.

I claim:

1. The method of repairing an injury on the outer surface of a pneumatic vehicle tire that comprises the steps of placing vulcanizable repair material on the portion to be repaired while the tire is inflated with an elastic fluid and on a wheel supporting the weight of the vehicle, then compressing said material tightly against said portion and flattening said portion under the influence of the weight of the vehicle and the said fluid inside the tire against a heated vulcanizing surface until said material is vulcanized.

2. The method of repairing an injury on the outer surface of a pneumatic vehicle tire that comprises the steps of placing vulcanizable repair material on the portion to be repaired while the tire is inflated with an elastic fluid and on a wheel supporting the weight of the vehicle, then moving said vehicle to rotate said wheel to a position in which said portion is against a heated vulcanizing surface between the wheel rim and the ground and coacts with the said fluid therein for supporting the weight of the vehicle, supporting said portion in said position with said material compressed under the influence of the weight of the vehicle and the fluid inside said tire against the heated vulcanizing surface until said material is vulcanized.

3. The method of repairing an injury on the outer surface of a pneumatic tire that comprises the steps of placing vulcanizable repair material on the portion to be repaired while the tire is inflated with an elastic fluid and on a wheel supporting the weight of the vehicle, then wedging the section of the tire including said portion between fixed opposed surfaces for tightly compressing said material under the influence of the said fluid inside the tire against one of said surfaces, heating said one of said surfaces until said material is vulcanized, and then unwedging said section from between said surfaces.

4. The method of repairing an injury on the outer surface of a pneumatic tire that comprises the steps of placing vulcanizable repair material on the portion to be repaired while the tire is inflated and is on a wheel supporting the weight of the vehicle, then wedging the section of the tire including said portion, under the influence of the weight of said vehicle and of power moving said vehicle on the ground, between fixed opposed surfaces supported on said ground for tightly compressing said material against one of said surfaces, heating said one of said surfaces until said material is vulcanized, then unwedging said section from between said surfaces by moving the vehicle on the ground so as to rotate said tire from between said surfaces.

5. A vulcanizer comprising a horizontally disposed base member and a pair of spaced side members extending upwardly therefrom adapted to tightly fit against the opposite side walls of an inflated vehicle supporting tire to be driven onto said base member between said side members, heating means carried by one of said members for vulcanizing repair material on the portion of said tire that is adapted to engage the wall carrying said heating means, said base member being a plate adapted to be supported on the ground, and said side members extending divergently to each other upwardly from said plate, and wing plates in generally opposed relationship respectively rigid with said side members and extending laterally and divergently relative to each other from said side members for causing a wedging of said tire between said side members when such tire is driven between the divergent ends of said wing plates and onto said base member.

6. The method of repairing an injury in a section of a pneumatic vehicle tire that comprises the steps of placing vulcanizable material on the injured section to be repaired while the tire is in vehicle supporting position mounted on the vehicle, moving said vehicle toward a stationary heated vulcanizing surface, then substituting steam for the air in said tire and holding said material tightly against said section under the combined internal pressure of said steam and the weight of said vehicle by said stationary heated vulcanizing surface and then moving the vehicle to cause said tire to roll away from said surface.

RAYMOND D. VAN TASSELL.

REFERENCES CITED

The following references are of record in the file of this patent:

UNITED STATES PATENTS

| Number | Name | Date |
|---|---|---|
| 949,154 | Meyer | Feb. 15, 1910 |
| 973,476 | Clough | Oct. 25, 1910 |
| 1,013,063 | Robbins et al. | Dec. 26, 1911 |
| 1,123,223 | Berk | Jan. 5, 1915 |
| 1,383,951 | Hurwitz | July 5, 1921 |
| 1,630,457 | Wheelock | May 31, 1927 |
| 1,875,727 | Heintz | Sept. 6, 1932 |
| 1,877,175 | Heintz | Sept. 13, 1932 |
| 2,185,543 | Daniel | Jan. 2, 1940 |
| 2,341,026 | Eakin | Feb. 8, 1944 |
| 2,370,241 | Heintz | Feb. 27, 1945 |